(12) United States Patent
Yarovoy et al.

(10) Patent No.: US 12,314,733 B2
(45) Date of Patent: May 27, 2025

(54) SYSTEMS AND METHODS FOR IMPLEMENTING A SHIM DATABASE DRIVER

(71) Applicant: Salesforce, Inc., San Francisco, CA (US)

(72) Inventors: Vadim Yarovoy, San Francisco, CA (US); Raghavendran Hanumantharau, San Francisco, CA (US); Olga Tikhonova, San Francisco, CA (US); Da Zhao, San Francisco, CA (US); Arundhati Tambe, San Francisco, CA (US); Shruti Sharma, San Jose, CA (US); Jason Woods, Atlanta, GA (US)

(73) Assignee: Salesforce, Inc., San Francisco, CA (US)

( * ) Notice: Subject to any disclaimer, the term of this patent is extended or adjusted under 35 U.S.C. 154(b) by 532 days.

(21) Appl. No.: 17/494,615

(22) Filed: Oct. 5, 2021

(65) Prior Publication Data

US 2023/0110698 A1     Apr. 13, 2023

(51) Int. Cl.
| G06F 9/445 | (2018.01) |
| G06F 9/4401 | (2018.01) |
| G06F 9/448 | (2018.01) |
| G06F 9/54 | (2006.01) |
| G06F 16/17 | (2019.01) |
| G06F 16/955 | (2019.01) |

(52) U.S. Cl.
CPC ........ *G06F 9/44505* (2013.01); *G06F 9/4411* (2013.01); *G06F 9/547* (2013.01); *G06F 16/17* (2019.01); *G06F 16/955* (2019.01); *G06F 9/44526* (2013.01); *G06F 9/449* (2018.02)

(58) Field of Classification Search
CPC ...... G06F 16/17; G06F 16/955; G06F 9/4411; G06F 9/44505; G06F 9/44526; G06F 9/449; G06F 9/547
See application file for complete search history.

(56) References Cited

U.S. PATENT DOCUMENTS

| 10,353,723 B2 | 7/2019 | Hanumantharau et al. |
| 10,523,425 B2 | 12/2019 | Hanumantharau et al. |

(Continued)

FOREIGN PATENT DOCUMENTS

| CN | 112889054 A | 6/2021 |
| EP | 3814968 A1 | 5/2021 |
| WO | 2020159694 A1 | 8/2020 |

*Primary Examiner* — Terrell S Johnson
(74) *Attorney, Agent, or Firm* — Kwan & Olynick LLP

(57) ABSTRACT

Disclosed are some implementations of systems, apparatus, methods and computer program products for implementing a shim driver configurable to provide a database driver. A shim driver class is loaded from a class path and instantiated such that a shim driver is generated. A directory path and database driver class name are obtained from a configuration file. An application transmits a request for a database driver via an application programming interface (API) of the shim driver, where the request includes the directory path and database driver class name. The shim driver loads a database driver class identified by the database driver class name using the directory path, instantiates the database driver class such that a first database driver is generated, and provides the first database driver responsive to the request.

20 Claims, 9 Drawing Sheets

(56) References Cited

U.S. PATENT DOCUMENTS

| | | | |
|---|---|---|---|
| 2005/0149947 A1* | 7/2005 | Callender | G06F 9/44521 |
| | | | 719/321 |
| 2016/0335104 A1* | 11/2016 | Elias | G06F 13/102 |
| 2018/0129592 A1* | 5/2018 | Li | G06F 11/3684 |
| 2019/0354719 A1 | 11/2019 | Obembe et al. | |
| 2020/0050693 A1 | 2/2020 | Obembe et al. | |
| 2020/0065021 A1* | 2/2020 | Mayatskikh | G06F 3/0604 |
| 2020/0250325 A1 | 8/2020 | Chong et al. | |
| 2021/0081427 A1 | 3/2021 | Obembe et al. | |
| 2021/0103561 A1 | 4/2021 | Obembe et al. | |
| 2021/0126964 A1 | 4/2021 | Obembe et al. | |

\* cited by examiner

SYSTEMS AND METHODS FOR IMPLEMENTING A SHIM DATABASE DRIVER

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with decoupling database drivers from web applications. More specifically, this patent document discloses techniques for implementing a shim driver that enables vendor-specific database drivers to be obtained and accessed.

BACKGROUND

A database driver is a computer program that implements a protocol for a database connection. The database driver provides an interface via which databases compatible with a specific database vendor implementation can be accessed. Examples of database protocols include Open Database Connectivity (ODBC) and Java Database Connectivity (JDBC).

BRIEF DESCRIPTION OF THE DRAWINGS

The included drawings are for illustrative purposes and serve only to provide examples of possible structures and operations for the disclosed systems, apparatus, methods and computer program products for facilitating implementation of a shim driver. These drawings in no way limit any changes in form and detail that may be made by one skilled in the art without departing from the spirit and scope of the disclosed implementations.

DETAILED DESCRIPTION

Figure 1:
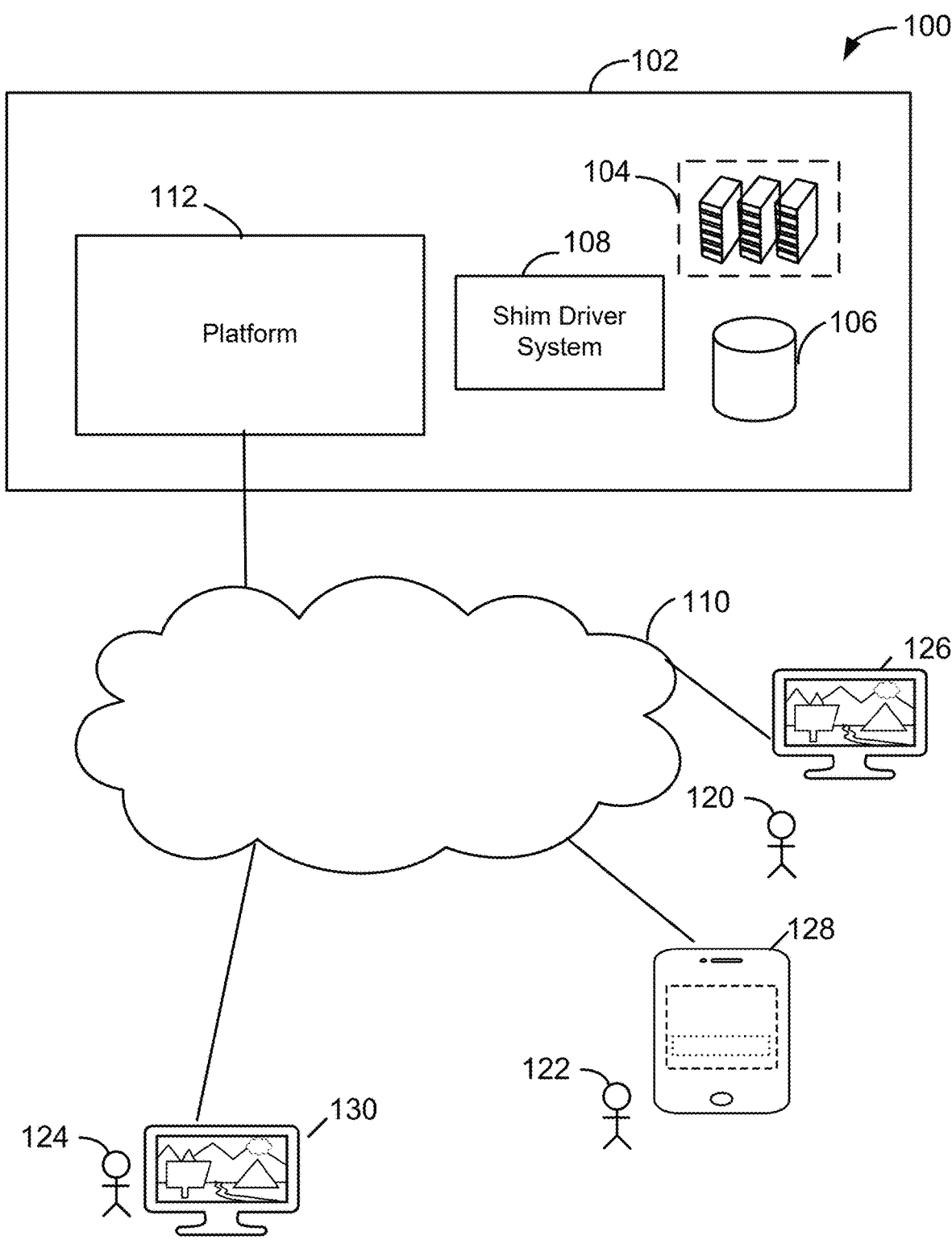
FIG. 1 shows a system diagram of an example of a system 100 in which a shim database driver can be implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured to implement a shim driver to obtain a vendor-specific database driver. In some implementations, systems, apparatus, methods, and computer program products are configured to implement the shim driver to manage a lifecycle of the vendor-specific database driver.

A database driver is a computer program that implements a particular protocol for a database connection. Generally, the database driver provides an interface to a specific database vendor implementation. Through the database driver, a computing device or application can access a database conforming to the protocol implemented by the database driver.

Java web applications typically implement database drivers that are tightly coupled to the applications. However, it is often desirable to test different versions of database drivers. Unfortunately, this generally requires that multiple versions of the application be built and deployed.

Java language has an associated application model for web deployment mandating that Java web applications are to be packaged in a specific manner with external dependencies (e.g., jar files or class files) placed in a specific location ( . . . /WEB-INF/lib) in order for a web container to universally locate and load the classes packaged in the jar files. The loading of various classes packaged in the jar files located in this location can be initiated at startup of a Java web application. As such, if multiple versions of the same database driver are made available in this location, this can produce an unpredictable class loading order (e.g., loading Version 2 classes instead of Version 1 classes). This can lead to various error conditions such as, for example, class compatibility, class not found, etc. Therefore, the placing multiple versions of the same class or jar files on the class path can produce unpredictable results. Furthermore, here are a number of drawbacks to implementing database drivers that are tightly coupled to web applications with which they are implemented. First, the standard process of building a different version of a web application for each version of a database driver is a labor intensive and time-consuming process. Second, while database drivers are often shipped with the web applications, there are a number of scenarios in which this may be undesirable. For example, licensing issues or other legal hurdles may provide obstacles to shipping a web application including certain vendor-specific database drivers to a customer (while shipping alternative ones).

In accordance with various implementations, class loading for any number of vendors and versions of database drivers can be performed from "hidden" directories. Hidden directories can include directories that are in locations other than that mandated by the Java Web Application model, as will be described in further detail below.

In accordance with various implementations, database drivers may be decoupled from web applications through the use of a shim driver. More particularly, the shim driver provides an application programming interface (API) via which an instance of a database driver class is created without exposing the creation logic and the newly created object is referenced using a common interface. A requesting entity can specify, via the API, the specific database driver class to be instantiated and the corresponding "hidden" directory containing the database driver class. Since a common interface is implemented for all database drivers, this enables the database driver class to be changed without modifying the web application referencing the database driver.

In accordance with various implementations, a server system obtains, using a configuration file, a first directory path associated with a first directory and a first identifier associated with a first database driver class. In some implementations, the first directory is a local directory of the server. In other implementations, the first directory is accessed via a network. The system transmits a first request via a first application programming interface (API) of a shim driver, where the first request has a first argument including the first directory path and a second argument including the first identifier associated with the first database driver class. The system obtains, via the first API, a first database driver corresponding to the first database driver class responsive to calling the first API, where the first database driver is configurable to implement a first database protocol in association with a database connection. The first database driver exposes a set of APIs via which various database operations on a database compatible with the first database protocol can be requested. The system stores the first database driver in a memory of the system. The system can then access the set of APIs to perform database operations during execution of an application, either automatically or responsive to a request from another application or device.

In some implementations, the server system can request a database operation via an API of the first database driver obtained via the shim driver. More particularly, the system can transmit, via an API of the first database driver, a request for a database operation in relation to a first database compatible with the first database protocol, where the first database driver is configurable to execute a set of computer-readable instructions of the first database driver responsive to processing the request for the database operation.

In some implementations, the first database driver has a java.sql.Driver interface. Thus, the API of the first database driver that is called can be an interface of a generic interface (e.g., java.sql.Driver interface) or a vendor-specific sub-interface of the first database driver.

In accordance with various implementations, a shim driver processes a request identifying a first directory path and a first identifier associated with a first database driver class, where the first directory path is associated with a first directory. The shim driver obtains the first database driver class stored in the first directory using the first identifier, where the first database driver class is configurable to implement a first database protocol in association with a database connection. The shim driver instantiates the first database driver class such that a first database driver corresponding to the first driver class is generated and provides the first database driver in response to the request. The first database driver exposes a set of APIs including a first API via which a database operation on a database compatible with the first database protocol can be requested. In some implementations, the shim driver has a java.sql.Driver interface.

In some implementations, the shim driver provides a second API via which a database driver can be unloaded. The server system may transmit a second request via the second API of the shim driver, where the second request has an argument including or otherwise identifying the first database driver. For example, the second API can accept an argument of the type java,sql.Driver. Responsive to the second request, the shim driver can unload the first database driver by removing it from its cache and destroy the class loader used to load the first database driver, resulting in the unloading of the classes associated with the first database driver.

FIG. 1 shows a system diagram of an example of a system 100 in which a shim database driver can be implemented, in accordance with some implementations. Database system 102 includes a variety of different hardware and/or software components that are in communication with each other. In the non-limiting example of FIG. 1, system 102 includes any number of computing devices such as servers 104. Servers 104 can include one or more web servers configurable to execute web applications. Servers 104 are in communication with one or more storage mediums 106 configured to store and maintain relevant data and/or metadata used to perform some of the techniques disclosed herein, as well as to store and maintain relevant data and/or metadata generated by the techniques disclosed herein. Storage mediums 106 may further store computer-readable instructions configured to perform some of the techniques described herein. Storage mediums 106 can also store user profiles of users of system 101, as well as database records such as customer relationship management (CRM) records. Java classes, instantiated objects, files, and/or directories such as those described herein.

System 102 includes shim driver system 108, which facilitates the implementation of a shim driver, as described herein. More particularly, shim driver system 108 can generate and provide database drivers using a shim driver, as well as manage the lifecycle of database drivers.

In some implementations, system 102 is configured to store user profiles/user accounts associated with users of system 102. Information maintained in a user profile of a user can include a client identifier such an Internet Protocol (IP) address or Media Access Control (MAC) address. In addition, the information can include a unique user identifier such as an alpha-numerical identifier, the user's name, a user email address, and credentials of the user. Credentials of the user can include a username and password. The information can further include job related information such as a job title, role, group, department, organization, and/or experience level, as well as any associated permissions. Profile information such as job related information and any associated permissions can be applied by system 102 to manage access to web applications or services such as those described herein.

Client devices 126, 128, 130 may be in communication with system 102 via network 110. More particularly, client devices 126, 128, 130 may communicate with servers 104 via network 110. For example, network 110 can be the Internet. In another example, network 110 comprises one or more local area networks (LAN) in communication with one or more wide area networks (WAN) such as the Internet.

Embodiments described herein are often implemented in a cloud computing environment, in which network 110, servers 104, and possible additional apparatus and systems such as multi-tenant databases may all be considered part of the "cloud." Servers 104 may be associated with a network domain, such as www.salesforce.com and may be controlled by a data provider associated with the network domain. In this example, employee users 120, 122, 124 of client computing devices 126, 128, 130 have accounts at Salesforce-.com®. By logging into their accounts, users 126, 128, 130 can access the various services and data provided by system 102 to employees. In other implementations, users 120, 122, 124 need not be employees of Salesforce.com® or log into accounts to access services and data provided by system 102. Examples of devices used by users include, but are not limited to, a desktop computer or portable electronic device such as a smartphone, a tablet, a laptop, a wearable device such as Google Glass®, another optical head-mounted display (OHMD) device, a smart watch, etc.

In some implementations, users 120, 122, 124 of client devices 126, 128, 130 can access services provided by system 102 via platform 112 or an application installed on client devices 126, 128, 130. More particularly, client devices 126, 128, 130 can log into system 102 via an application programming interface (API) or via a graphical user interface (GUI) using credentials of corresponding users 120, 122, 124 respectively. Client devices 126, 128, 130 can communicate with system 102 via platform 112. Communications between client devices 126, 128, 130 and system 102 can be initiated by a user 120, 122, 124. Alternatively, communications can be initiated by system 102 and/or application(s) installed on client devices 126, 128, 130. Therefore, communications between client devices 126, 128, 130 and system 102 can be initiated automatically or responsive to a user request.

A web application executing via system 102 can implement shim driver system 108 to obtain database drivers, as well as access or provide database services using database drivers generated via shim driver system 108. Client devices 126, 128, 130 can access the web application via platform 112. In some implementations, client devices 126, 128, 130 can access the database services or data obtained therefrom via the web application. In some implementations, databases can be implemented via system 102.

Some implementations may be described in the general context of computing system executable instructions, such as program modules, being executed by a computer. The disclosed implementations may further include objects, data structures, and/or metadata, which may facilitate the implementation of a shim driver or database drivers obtained via the shim driver.

Some implementations may also be practiced in distributed computing environments where tasks are performed by remote processing devices that are linked through a communications network. In a distributed computing environment, program modules may be located in local and/or remote computer storage media including memory storage devices.

Figure 2:
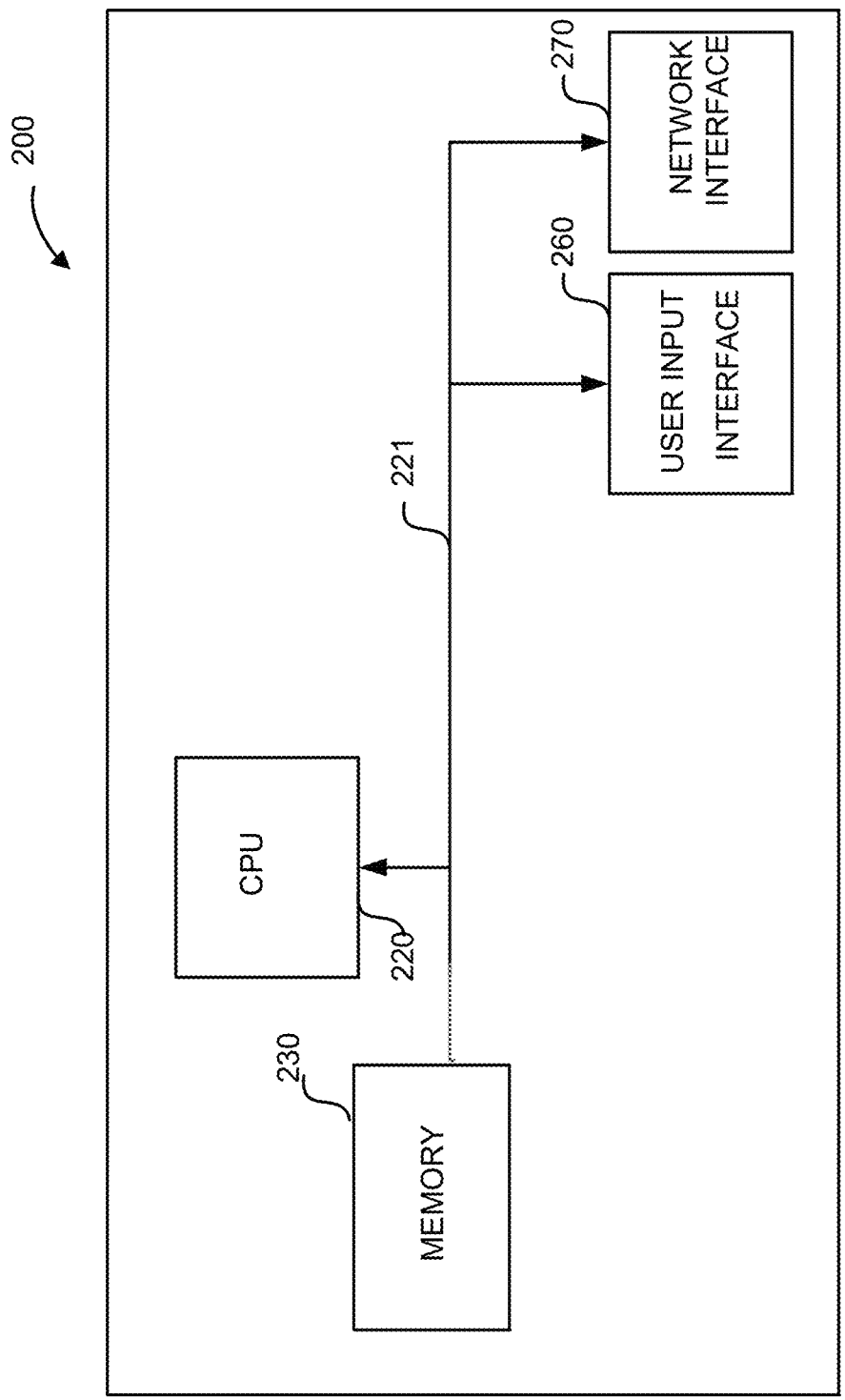
FIG. 2 is a diagram of an example computing system 200 that may be used with some implementations.

A computing device that operates as a server or client device may be implemented via any suitable computing system. FIG. 2 is a diagram of an example computing system 200 that may be used with some implementations. Computing system 200 may include a central processing unit (CPU) 220 having one or more processing cores and a memory 230. In addition, computing system 200 may include a system bus 221 that couples with various system components including the memory 230 and the CPU 220.

In some implementations, computing system 200 includes a variety of computer program product. A computer program product can be any available media that can be accessed by computing system 200 including, but not limited to, volatile and nonvolatile media, removable and non-removable media. A computer program product may store information such as computer readable instructions, data structures, or other data such as that described herein.

Memory 230 may include read only memory (ROM)) and/or random-access memory (RAM). In some implementations, memory 230 stores computer readable instructions, data structures, and/or data, which may be generated or processed as described herein.

In some implementations, a user may interact with the computing system 200 through an input device such as a keyboard, a microphone, a remote control, and/or a pointing device such as a mouse, touch pad, or touch screen. These and other input devices may be connected to the CPU 220 through a user input interface 260. Alternatively, an input device may be connected to computing system 200 by another interface such as a universal serial bus (USB) port or wireless interface.

Computing system 200 may operate in a networked environment via which it may connect to a system such as that described above with reference to FIG. 1. Computing system 200 may be connected to a local or wide area network through a network interface or adapter 270.

A web application is typically packed as a WAR file and deployed on a server. When deployed, the name of the WAR file becomes the root path of the web application within a computer network.

Figure 3A:
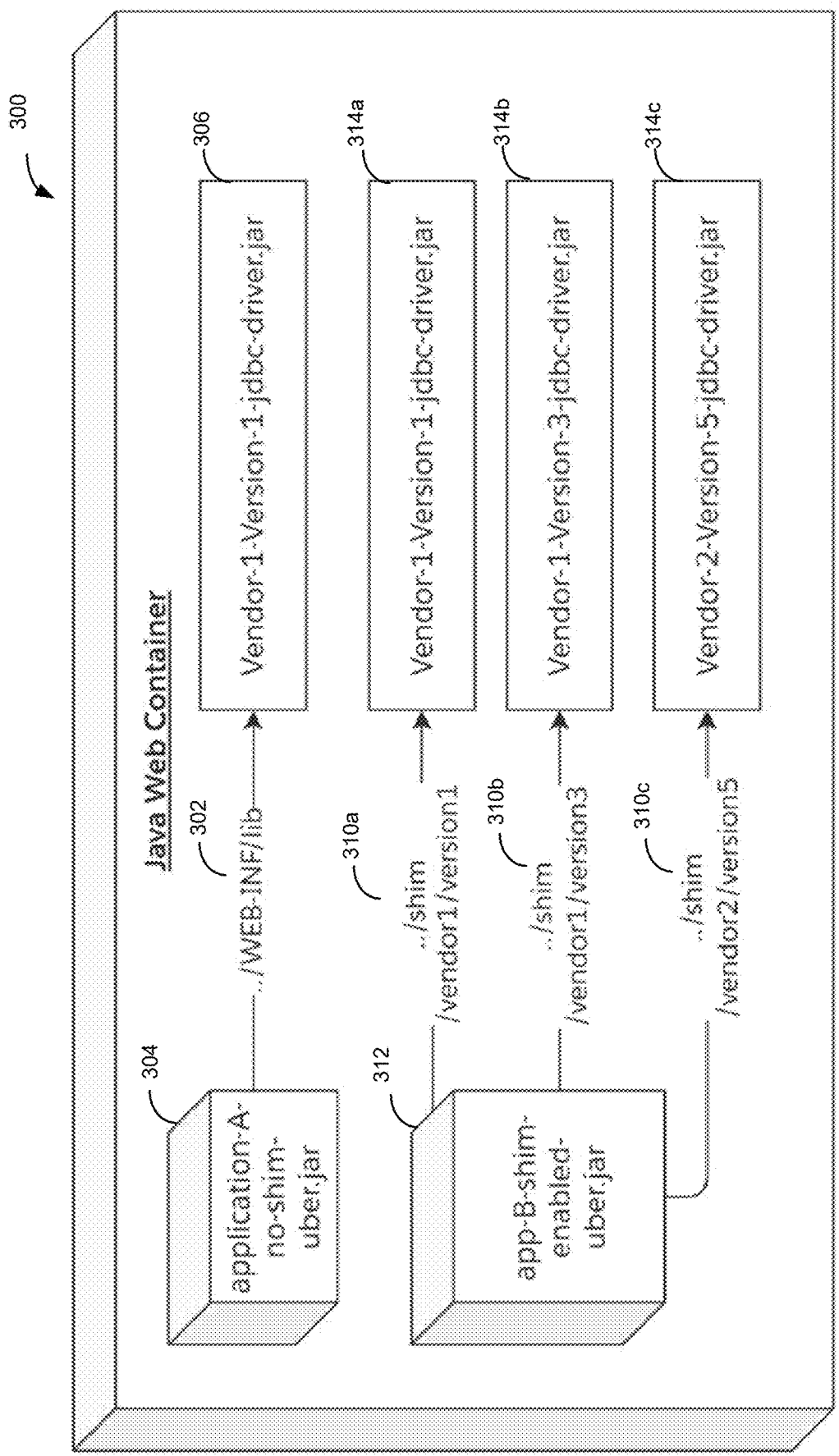
FIG. 3A is a diagram of an example Java web container deployment directory structure 300 that may be used with some implementations.

FIG. 3A is a diagram of an example Java web container deployment directory structure 300 that may be used with some implementations. Typically, the WAR file contains a WEB-INF directory, which contains deployment information and application code. The WEB-INF/lib directory 302 typically contains JAR files 304. In this example, JAR files 304 include application-A-no-shim-uber.jar. While JAR files 304 within the WEB-INF/lib directory 302 can include vendor-specific jar files 306, there are a number of drawbacks to making multiple versions of the same database driver available in the WEB-INF/lib directory 302, as discussed above.

In accordance with various implementations, class files associated with database drivers are packaged in JAR files that are stored in one or more "hidden" directories. In this example, "hidden" directories include directories 310*a*, 310*b*, 310*c*. More particularly, an application uber jar 312 can include vendor-specific JAR files 314*a*, 314*b*, 314*c* that are placed in respective "hidden" directories 310*a*, 310*b*, 310*c*. For example, uber jar 312 can include vendor-specific JAR files 314.*a*, 314*b*, 314*c* that each corresponds to a particular vendor and version of a database driver.

In this example, a directory path " . . . /shim/" is associated with a single directory containing the JAR files in which class files associated with the database drivers are packaged. Within the directory, each JAR file is placed in a corresponding subdirectory. Therefore, each of the hidden directories 310*a*, 310*b*. 310*c* can contain a single JAR file.

As shown in this example, each of the hidden directories 310*a*, 310*b*, 310*c* may correspond to a specific database vendor and version. For example, directory " . . . /shim/vendor1/version1" 310*a* corresponds to vendor 1, version 1 and contains a corresponding JAR file vendor-1-version-1-jdbc-driver.jar; directory " . . . /shim/vendor1/version3" 310*b* corresponds to vendor 1, version 3 and contains a corresponding JAR file vendor-1-version-3-jdbc-driver.jar; and directory " . . . /shim/vendor2/version5" 310*c* corresponds to vendor 2, version 5 and contains a corresponding JAR file vendor-2-version-5-jdbc-driver.jar. Therefore, through the use of hidden directories, an unlimited number of database vendors and versions may be supported.

In accordance with various implementations, driver class loading is not performed automatically since the hidden directory is not part of the class path. Rather, driver class loading is performed responsive to requests that can be transmitted by a web application, as will be described in further detail below.

Figure 3B:
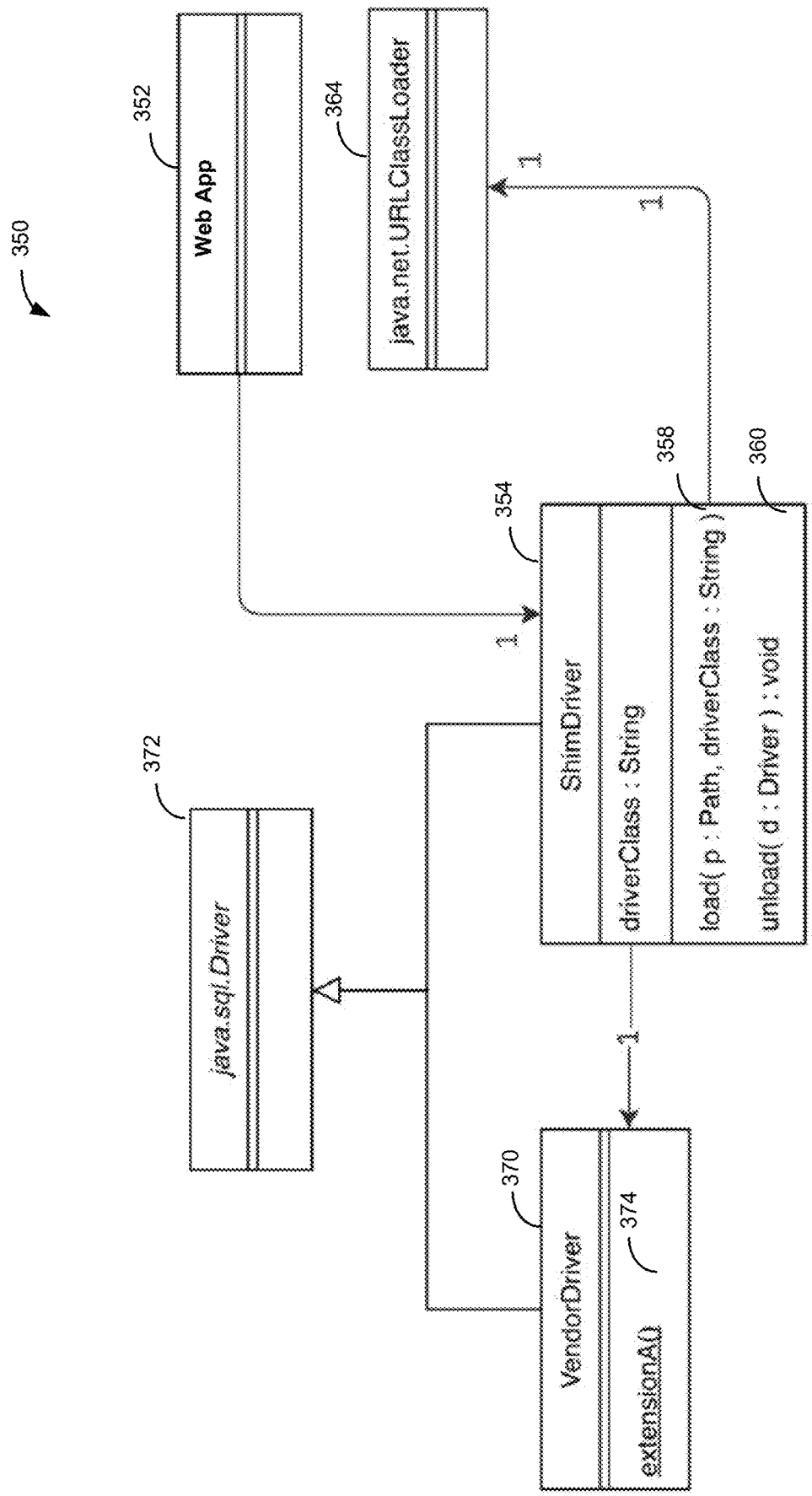
FIG. 3B shows a diagram of an example shim driver class structure 350 that may be used with some implementations.

FIG. 3B shows a diagram of an example shim driver class structure 350 that may be used with some implementations. A web container is the component of a web server that interacts with Java servlets. During execution of a web application 352, web application 352 can communicate with shim driver 354 to obtain a database driver. More particularly, shim driver 354 provides a first API 358 via which a database driver can be obtained or loaded. In this example, first API 358 corresponds to a load method of shim driver 354. In some implementations, load method has two parameters that include a directory path and a string that corresponds to a driver class name. By calling first API 358, a web application can obtain a database driver associated with a specific database driver class located in a particular specified directory.

In some implementations, responsive to calling first API 358 (e.g., load method), shim driver 354 calls a java.net.URLClassLoader 364 to load a database driver class associated with the driver class name from the directory specified by the directory path (e.g., URL). Shim driver 354 generates an instance of a database driver 370 by instantiating the database driver class.

In some implementations, database drivers obtained via shim driver 354 share a common interface. For example, database driver 370 can have a java.sql.Driver interface. In addition, shim driver 354 may also have a java.sql.Driver interface.

As shown in this example, database driver 370 may provide one or more vendor specific methods 374 that are not part of the java.sql.Driver interface. In some implementations, a caller of database driver 370 unwraps the generic driver interface to access the vendor specific methods 374 of a vendor specific sub-interface of database driver 370.

In some implementations, database driver 370 can have a java.sql.Wrapper interface, which would allow for vendor specific extension use while preserving the generic nature of the client code. The java.sql.Wrapper interface can provide an unwrap method that returns an object that provides driver-specific methods.

It may be desirable to run or test a different database driver while the web application is executing. In some implementations, shim driver 354 provides a second API 360 (e.g., unload method) via which a database driver can be removed or unloaded. In this example, second API 360 corresponds to an unload method of shim driver 354. In some implementations, unload method has one parameter that includes a database driver. During runtime, a web application can delete the database driver and associated classes by calling second API 360. Alternatively, database drivers and associated classes can be eliminated by ending execution of the web application and reinitiating execution of the web application (e.g., using a different or modified configuration file).

In some instances, second API 360 or another API of shim driver can be called in response to a command received from a client device initiated in response to an action of a user such as a system administrator. For example, the user can click on a link corresponding to a uniform resource locator (URL) that calls second API 360. The loading of a new database driver can similarly be initiated by a command received from a client device. For example, the user can click on another link corresponding to another URL that calls first API 358. In other implementations, the user can click a link corresponding to a URL that calls second API 360 to unload the current database driver and subsequently calls first API 358 to load a different database driver.

It is often desirable to upgrade or test database drivers as new versions become available. Conversely, in the event that a current version of a database driver is error-prone, it may be desirable to "roll back" to a previous version of the database driver. Moreover, in some instances, it may be desirable to implement a database driver of a different vendor from that previously implemented.

Through the use of a shim driver, a mechanism is provided that enables database drivers provided by a variety of database vendors to be implemented without modifying the code of the web application implementing the database drivers. Moreover, upgrades and "rollbacks" across multiple versions of a database driver can be implemented with minimal effort.

Figure 4:
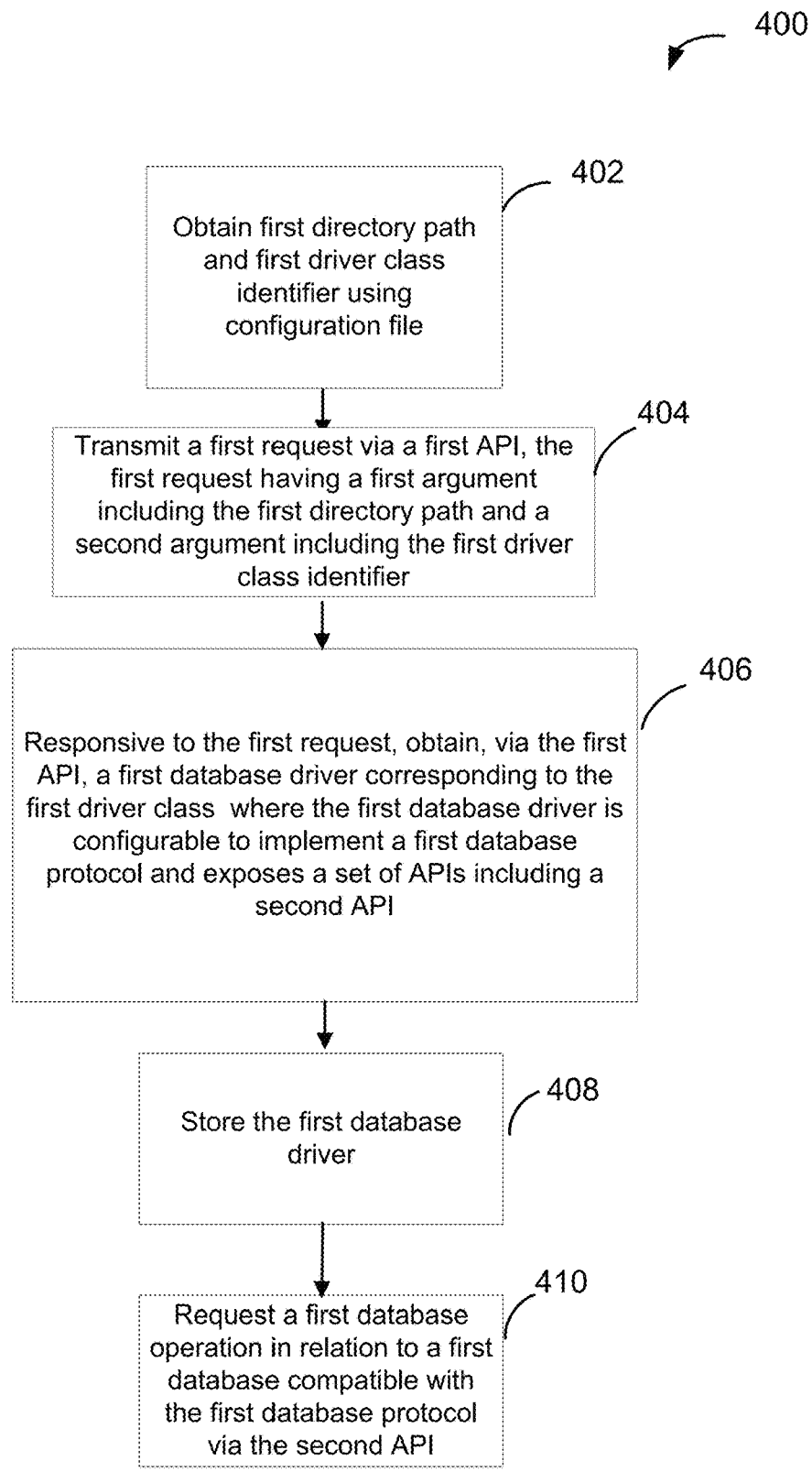
FIG. 4 shows a process flow diagram illustrating a method of obtaining a database driver using a shim database driver, in accordance with various implementations.

FIG. 4 shows a process flow diagram illustrating a method of obtaining a database driver using a shim database driver, in accordance with various implementations. Execution of a web application by a server is initiated and the class path is obtained. The value of the class path can be set via a command line option or CLASSPATH environment variable of the web application.

For example, an administrator can initiate execution of the web application by typing "Java-classpath:c:abc/xyz . . . My App." A java virtual machine (JVM) can search for a class named MyApp and initiate execution of a main method of MyApp.

The JVM loads application-specific classes from the class path. The application-specific classes include a shim driver class but do not include database driver classes.

The web application instantiates the shim driver class such that a shim driver is obtained. Instantiation of the shim driver class can be performed, for example, when the web application determines that a database driver is needed to perform database operations.

During execution of the web application, a server obtains, using a configuration file, a first directory path associated with a first directory and a first identifier associated with a first database driver class at 402. More particularly, the web application searches for a configuration file (e.g., default properties file) in the WAR file. The web application then obtains a directory path associated with a directory and a name of a database driver class from the configuration file, as described in further detail below.

In some implementations, the web application parses the configuration file to obtain one or more key value pairs. More particularly, the configuration file can include or otherwise indicate a directory path via which a database driver class can be obtained. In addition, the configuration file can include or otherwise indicate a database driver class name. For example, the configuration file can include a directory path " . . . /shim/vendor1/version1" and an associated driver class name "Vendor1-version1-driverclass," which is located in the corresponding JAR file, vendor-1-version-3-jdbc-driver.jar.

In other implementations, the web application can construct the directory path using a root directory within the configuration file and information within the configuration file that identifies or otherwise indicates a subdirectory within the root directory. For example, the root directory can include the prefix " . . . /shim/" and the subdirectory can be derived from a vendor and version specified in the configuration file.

The server then transmits a first request via a first application programming interface (API) of the shim driver at 404, where the first request has a first argument including the first directory path and a second argument including the first identifier associated with the first database driver class. By transmitting the first request, a load method of the shim driver may be called. Operation of a shim driver will be described in further detail below with reference to FIG. 5.

Responsive to calling the first API, the web application obtains, via the first API, a first database driver corresponding to the first database driver class at 406. The first database driver is configurable to implement a first database protocol in association with a database connection. In addition, the first database driver exposes a set of APIs including a second API via which a database operation on a database compatible with the first database protocol can be requested. The web application stores the first database driver in a memory at 408.

In some implementations, the first database driver returned by the shim driver is "wrapped" in an instance of the shim driver. In other words, the responsive to the first request, the shim driver may provide an instance of the shim driver, where the instance references the first database driver.

The web application can then call an API of the first database driver to request a corresponding database operation. More particularly, the web application can transmit a second request via the second API of the first database driver at 410, where the first database driver is configurable to execute a set of computer-readable instructions of the first database driver responsive to processing the second request. By calling the second API, the web application can request a corresponding database operation in relation to a first database compatible with the first database protocol. For example, the second API can correspond to a delete method, where the delete method of the first database driver is executed responsive to processing the second request. As another example, the second API can correspond to a query method. Thus, in some instances, the second API can have one or more parameters for which values are provided via the second request.

In some implementations, methods exposed by the instance of the shim driver may be called, causing the shim driver instance to delegate the calls to the first database driver. The web application may unwrap the first database driver to access vendor specific methods of the first database driver.

To switch to a different database driver, the web application can be shut down and restarted with a different or modified configuration file. Alternatively, to switch database drivers at runtime, the web application, another application, or a client device can issue a command to unload the database driver. For example, an administrator can select an option that calls a corresponding URL (e.g., https://salesforce/unload/oracle), which calls a second API of the shim driver. More particularly, by calling a second API with an argument including the first database driver, the unload command of the shim driver can be called. The web application, another application, or a client device can subsequently issue another command to load a new database driver in a similar manner. In some implementations, by calling a URL, an unload method of the shim driver is called to remove the first database driver and a load method of the shim driver is subsequently called to obtain a new database driver.

A shim driver generates and provides a database driver responsive to a request received from a web application. In addition, the shim driver or instance thereof can manage the lifecycle of the database driver by enabling the database driver and associated classes to be unloaded from memory.

Figure 5:
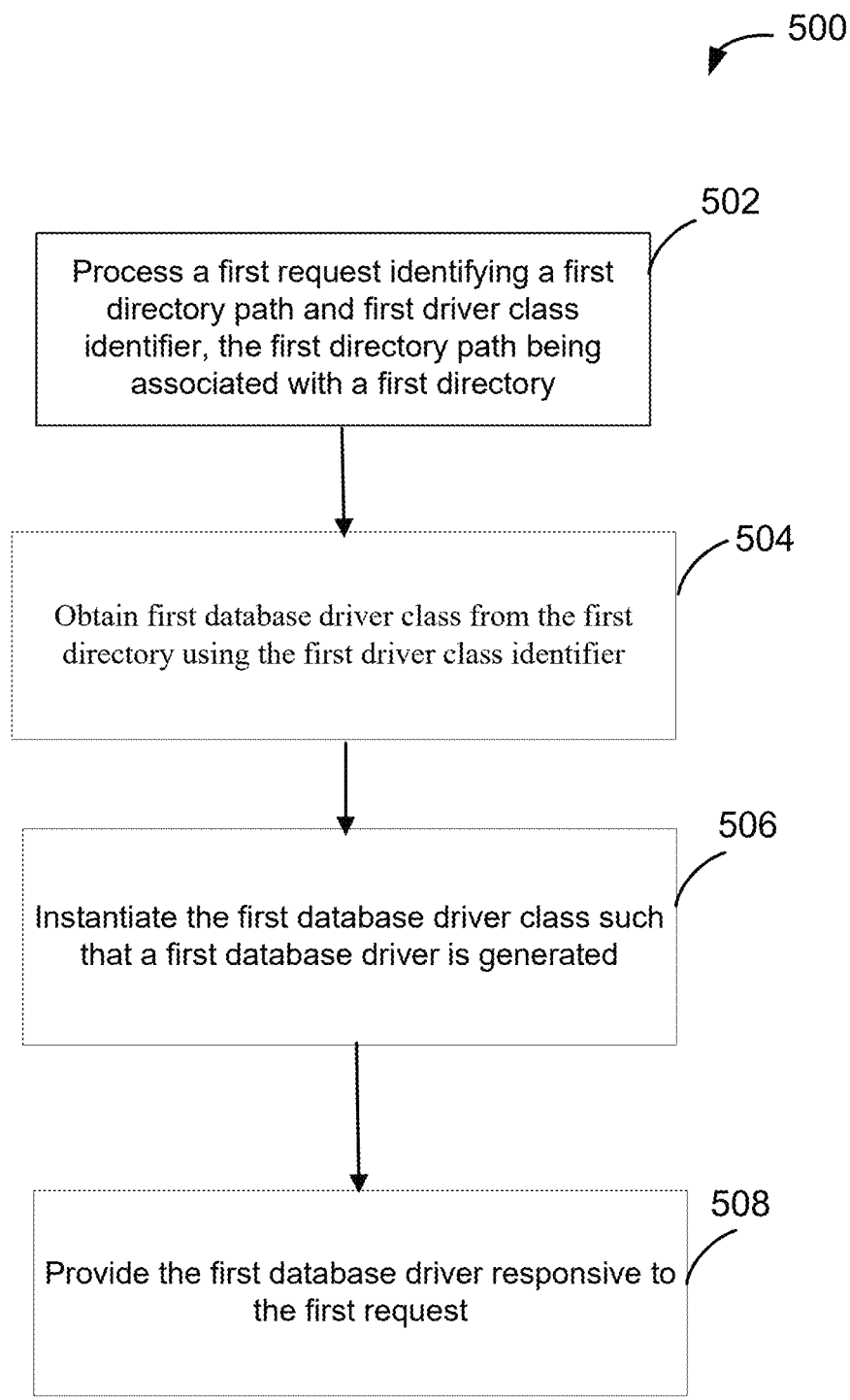
FIG. 5 shows a process flow diagram illustrating a method of implementing a shim database driver, in accordance with various implementations.

FIG. 5 shows a process flow diagram illustrating a method of implementing a shim database driver, in accordance with various implementations. As described above at 404, an application such as a web application transmits a first request identifying a first directory path and a first identifier associated with a first database driver class via a first API of the shim driver (e.g., corresponding to a load method of the shim driver), where the first directory path is associated with a first directory. A server implementing the shim driver processes the first request received from the application at 502. For example, the shim driver may obtain the first directory path and first identifier received via the first API. In other implementations, the first request does not include the first identifier.

The server may obtain the first database driver class stored in the first directory (e.g., using the first identifier) at 504, where the first database driver class is configurable to implement a first database protocol in association with a database connection. As described above, the first directory can be a local directory of the server. In other implementations, the first directory can be accessed via a network. More particularly, the server may construct a class loader. For example, the server can call a URLClassLoader method with an argument including a URL associated with the directory path. The server can then call a method of the class loader to load the database driver class identified by the first identifier. For example, the server can then call a loadClass method of the class loader with an argument including the identifier of the first database driver class. As another example, the server can call an addURL method of the class loader with an argument including the URL to search for classes in the corresponding directory. As yet another example, the server can call a findResource method of the class loader with an argument including the first identifier associated with the first database driver class.

The server instantiates the first database driver class such that a first database driver corresponding to the first driver class is generated at 506. For example, the server can call a newInstance method with an argument including the first identifier associated with the first database driver class.

The server then provides the first database driver responsive to the first request at 508. The first database driver exposes a set of APIs including a first API via which a device can request a corresponding database operation on a database compatible with the first database protocol. For example, the first API can correspond to a delete record method, a create record method, or query method. In this manner, the server returns a database driver responsive to the first request.

In some implementations, the first database driver has a java.sql.Driver interface. By providing a generic driver interface, an application can access any database driver without modifying the application to call specific database drivers.

In some implementations, the server generates an instance of the shim driver that contains a reference (e.g., pointer) to the first database driver and returns the instance of the shim driver responsive to the first request. Instances of the shim driver may also have a java.sql.Driver interface, enabling calls to methods of the shim driver instance to be "passed through" to methods of the first database driver.

In some implementations, the first database driver (e.g., a shim driver instance) further includes a java.sql.Wrapper interface that can be called to access vendor-specific functionality of the first database driver once the first database driver is received. In this manner, the vendor-specific methods of the first database driver class may be exposed.

In some instances, the database driver may be switched during runtime. Responsive to receiving a request via a second API of the shim driver, a server can execute a corresponding unload method of the shim driver. More particularly, the shim driver can call a URLClassLoader close method of the class loader that loaded the first database driver class. The server can dereference the first database driver class and any dependencies in memory, resulting in the removal of the first database class and any dependencies from its cache. In addition, the server deletes the first database driver from memory. Another database driver may subsequently be loaded, as described herein.

Through the disclosed implementations, multiple database driver classes can be deployed in a single application uber-jar, thus allowing for single artifact deployment and switching between multiple database driver versions at startup or during runtime of the application. Moreover, roll-backs and roll-forwards may be enabled allowing quick return to the last known operable configuration without the need to redeploy the application. Furthermore, expired or legally-restricted driver classes may be removed from the application uber-jar, allowing deployment to computing systems that may have licensing or security restrictions on specific database vendors.

Some but not all of the techniques described or referenced herein are implemented using or in conjunction with a database system. Salesforce.com, inc. is a provider of customer relationship management (CRM) services and other database management services, which can be accessed and used in conjunction with the techniques disclosed herein in some implementations. In some but not all implementations, services can be provided in a cloud computing environment, for example, in the context of a multi-tenant database system. Thus, some of the disclosed techniques can be implemented without having to install software locally, that is, on computing devices of users interacting with services available through the cloud. Some of the disclosed techniques can be implemented via an application installed on computing devices of users.

Information stored in a database record can include various types of data including character-based data, audio data, image data, animated images, and/or video data. A database record can store one or more files, which can include text, presentations, documents, multimedia files, and the like. Data retrieved from a database can be presented via a computing device. For example, visual data can be displayed in a graphical user interface (GUI) on a display device such as the display of the computing device. In some but not all implementations, the disclosed methods, apparatus, systems, and computer program products may be configured or designed for use in a multi-tenant database environment.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, tide, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 6A:
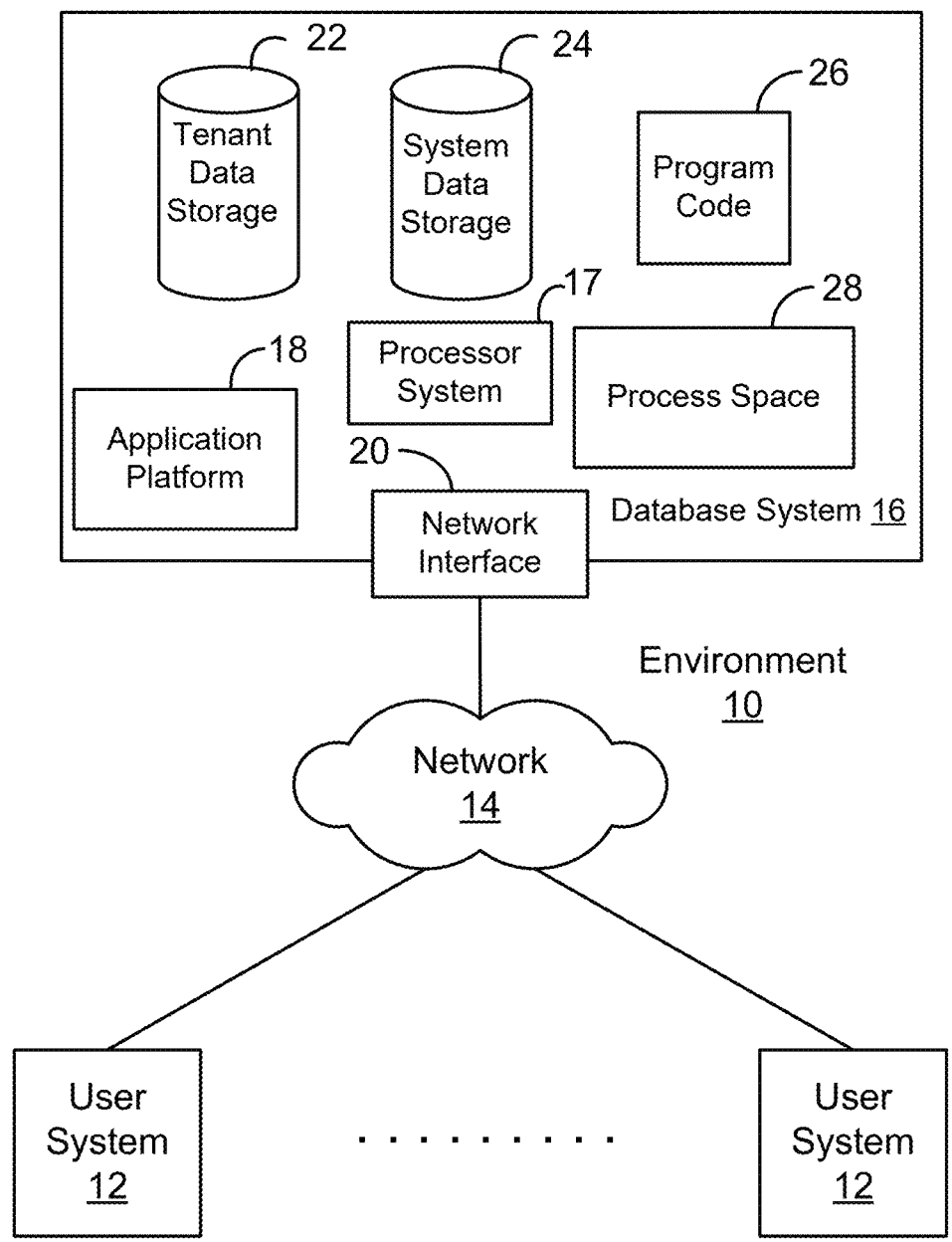
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7A:
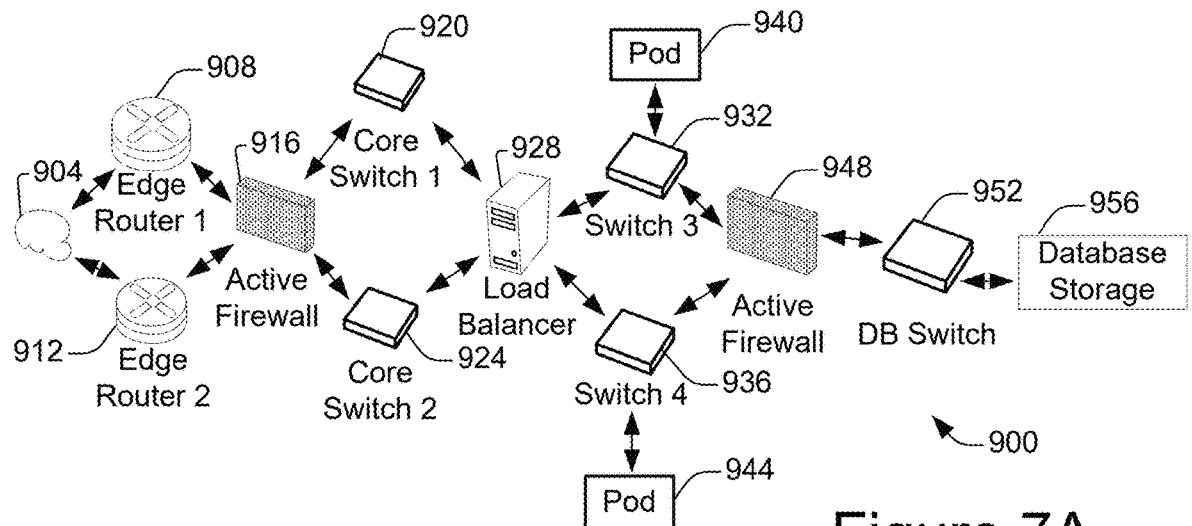
FIG. 7A shows a system diagram of an example of architectural components of an on-demand database service environment 900, in accordance with some implementations.
Figure 7B:
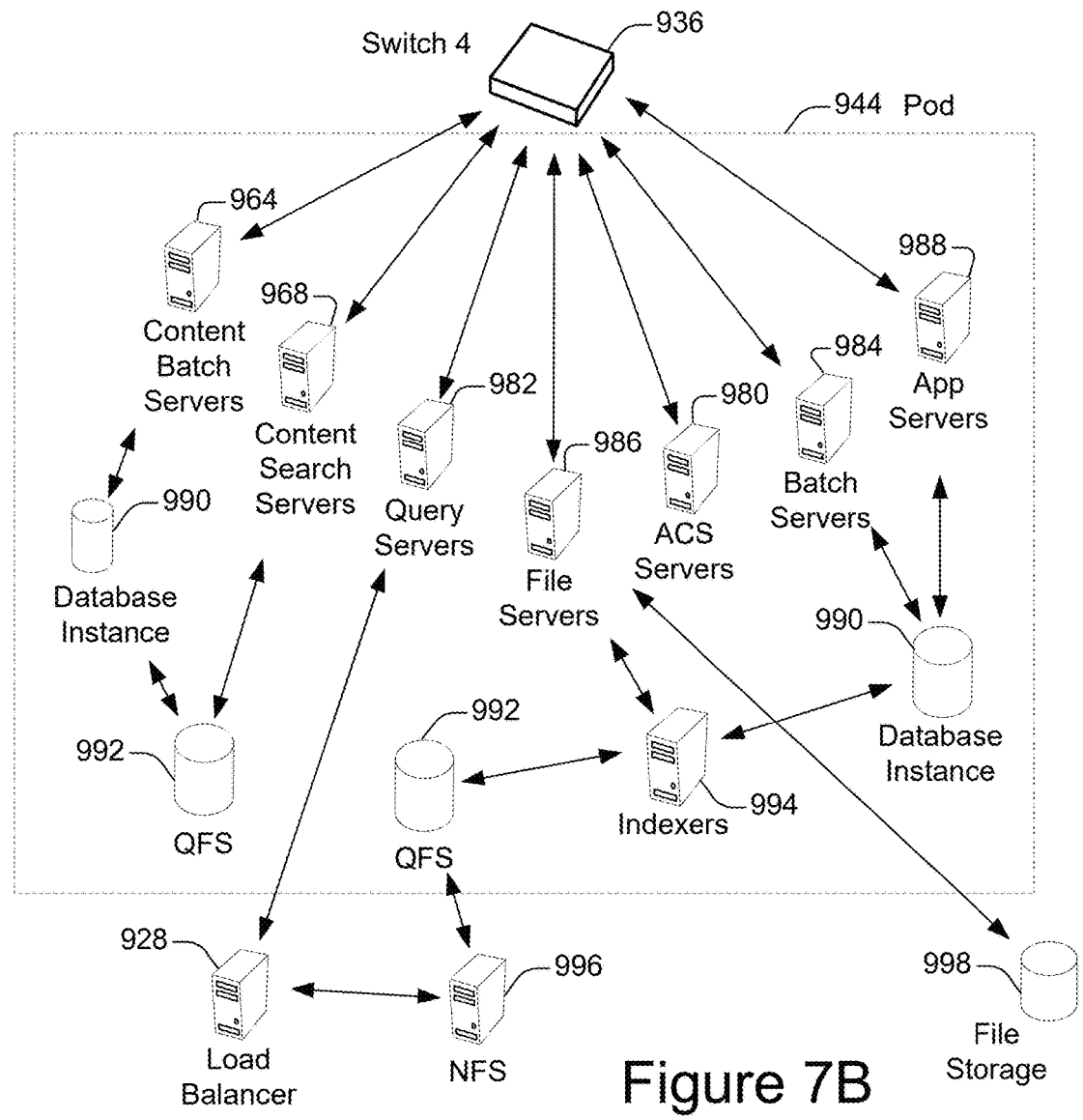
FIG. 7B shows a system diagram further illustrating an example of architectural components of an on-demand database service environment, in accordance with some implementations.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 6B:
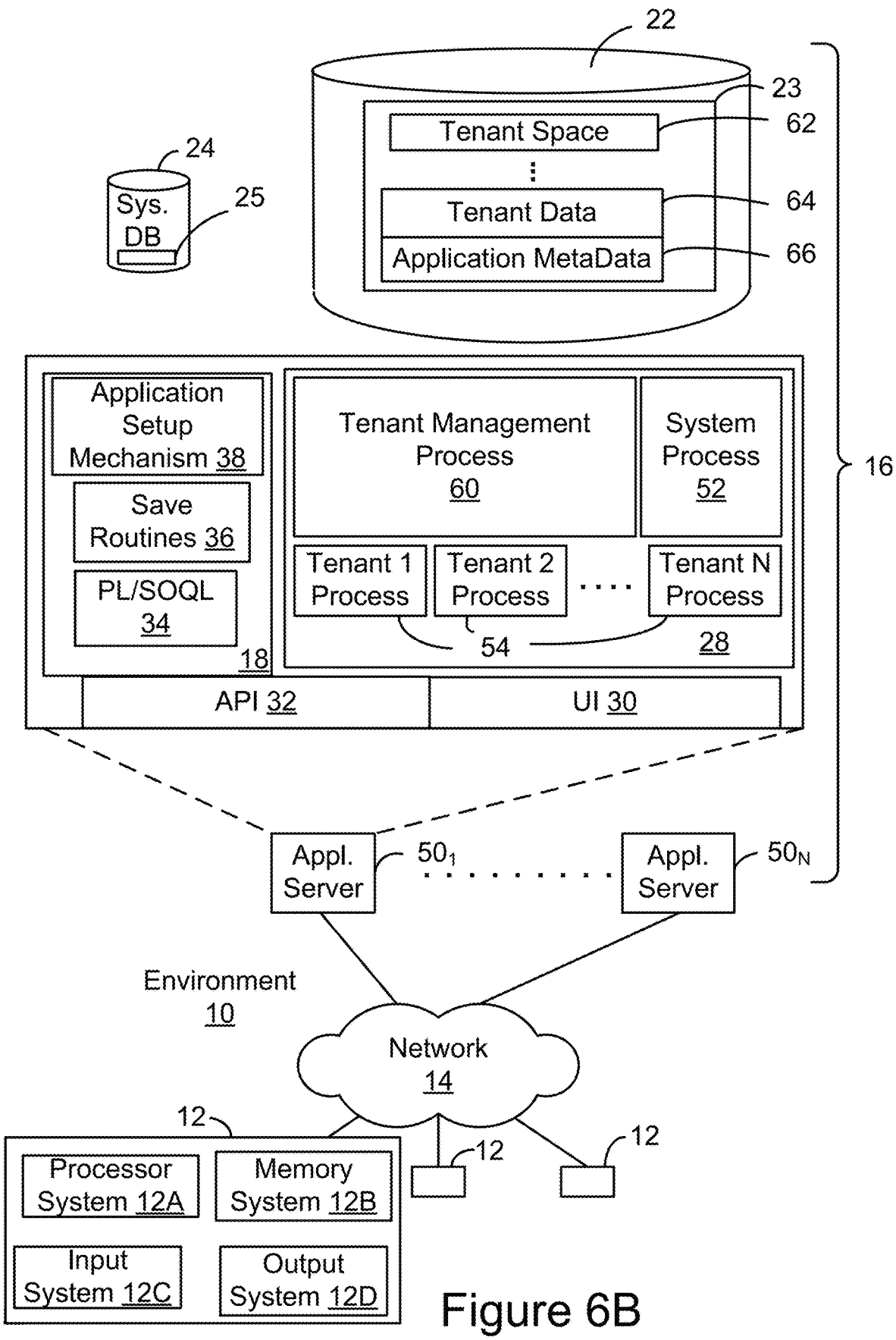
FIG. 6B shows a block diagram of an example of some implementations of elements of FIG. 6A and various possible interconnections between these elements.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle®, databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, California. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 7B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 7B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 6A, 6B, 7A and 7B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 6A, 6B, 7A and 7B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
    a database system implemented using a server system, the database system configurable to cause:
    obtaining, using a configuration file, a first directory path associated with a first directory and a first identifier associated with a first database driver class, the first directory being a hidden directory;
    loading a set of classes via a class path, the set of classes including a shim driver class;
    instantiating the shim driver class such that a shim driver object is generated, the shim driver object providing a first application programming interface (API);
    transmitting, a first request via the first API, the first request having a first argument including the first directory path and a second argument including the first identifier associated with the first database driver class;
    obtaining, via the first API, a first database driver corresponding to the first database driver class responsive to calling the first API, the first database driver configurable to implement a first database protocol in association with a database connection, the first database driver exposing a set of APIs including a second API via which a device can request a database operation on a database compatible with the first database protocol;
    storing the first database driver in a memory of the system; and
    requesting a first database operation in relation to a first database compatible with the first database protocol via the second API, the first database driver configurable to execute a set of computer-readable instructions of the first database driver responsive to processing the request for the first database operation.

2. The system of claim 1, the first database driver having a java.sql.Driver interface.

3. The system of claim 1, the first database driver having a java.sql.Wrapper interface.

4. The system of claim 1, the database system further configurable to cause:
    deleting the first database driver by transmitting a second request via a second API, the second request having an argument including the first database driver.

5. The system of claim 1, the database system further configurable to cause:
    processing a request received from a client device, the request including a uniform resource locator (URL); and
    responsive to the request received from the client device, deleting the first database driver by transmitting a second request via a second API, the second request having an argument including the first database driver.

6. The system of claim 1, the database system further configurable to cause:
    generating the first directory path using information obtained from the configuration file.

7. The system of claim 1, wherein storing the first database driver includes storing class files associated with the first database driver in one or more hidden directories.

8. The system of claim 1, wherein the first database driver class is an earlier version of the first database driver, enabling the shim driver to perform a rollback to the earlier version of the first database driver.

9. A method, comprising:
processing, by a server, a first request identifying a first directory path and a first identifier associated with a first database driver class, the first directory path being associated with a first directory, the first directory being a hidden directory;
obtaining, by a server, the first database driver class stored in the first directory using the first identifier, the first database driver class being configurable to implement a first database protocol in association with a database connection;
instantiating the first database driver class such that a first database driver corresponding to the first driver class is generated; and
providing the first database driver responsive to the first request, the first database driver exposing a set of APIs including a first API via which a device can request a database operation on a database compatible with the first database protocol.

10. The method of claim 9, the first database driver having a java.sql.Driver interface.

11. The method of claim 9, the first database driver having a java.sql.Wrapper interface.

12. The method of claim 9, further comprising:
loading the first database driver class via a class loader.

13. The method of claim 9, further comprising:
processing, by a server, a second request received via a second API; and
responsive to processing the second request,
deleting the first database driver class via a class loader; and
deleting the first database driver.

14. The method of claim 13, the second request including the first database driver.

15. A computer program product comprising computer-readable program code capable of being executed by one or more processors when retrieved from a non-transitory computer-readable medium, the program code comprising computer-readable instructions configurable to cause:
obtaining, using a configuration file, a first directory path associated with a first directory and a first identifier associated with a first database driver class, the first directory being a hidden directory;
loading a set of classes via a class path, the set of classes including a shim driver class;
instantiating the shim driver class such that a shim driver object is generated, the shim driver object providing a first application programming interface (API);
transmitting, a first request via the first API, the first request having a first argument including the first directory path and a second argument including the first identifier associated with the first database driver class;
obtaining, via the first API, a first database driver corresponding to the first database driver class responsive to calling the first API, the first database driver configurable to implement a first database protocol in association with a database connection, the first database driver exposing a set of APIs including a second API via which a device can request a database operation on a database compatible with the first database protocol;
storing the first database driver; and
requesting a first database operation in relation to a first database compatible with the first database protocol via the second API, the first database driver configurable to execute a set of computer-readable instructions of the first database driver responsive to processing the request for the first database operation.

16. The computer program product of claim 15, the first database driver having a java.sql.Driver interface.

17. The computer program product of claim 15, the first database driver having a java.sql.Wrapper interface.

18. The computer program product of claim 15, the program code comprising computer-readable instructions further configurable to cause:
deleting the first database driver by transmitting a second request via a second API, the second request having an argument including the first database driver.

19. The computer program product of claim 15, the program code comprising computer-readable instructions further configurable to cause:
processing a request received from a client device, the request including a uniform resource locator (URL); and
responsive to the request received from the client device, deleting the first database driver by transmitting a second request via a second API, the second request having an argument including the first database driver.

20. The computer program product of claim 15, the program code comprising computer-readable instructions further configurable to cause:
generating the first directory path using information obtained from the configuration file.

* * * * *